April 12, 1955
A. W. CAPS ET AL
2,705,907
ELECTRIC CONTROL CIRCUIT FOR A CAMERA
Filed June 26, 1951
3 Sheets-Sheet 1
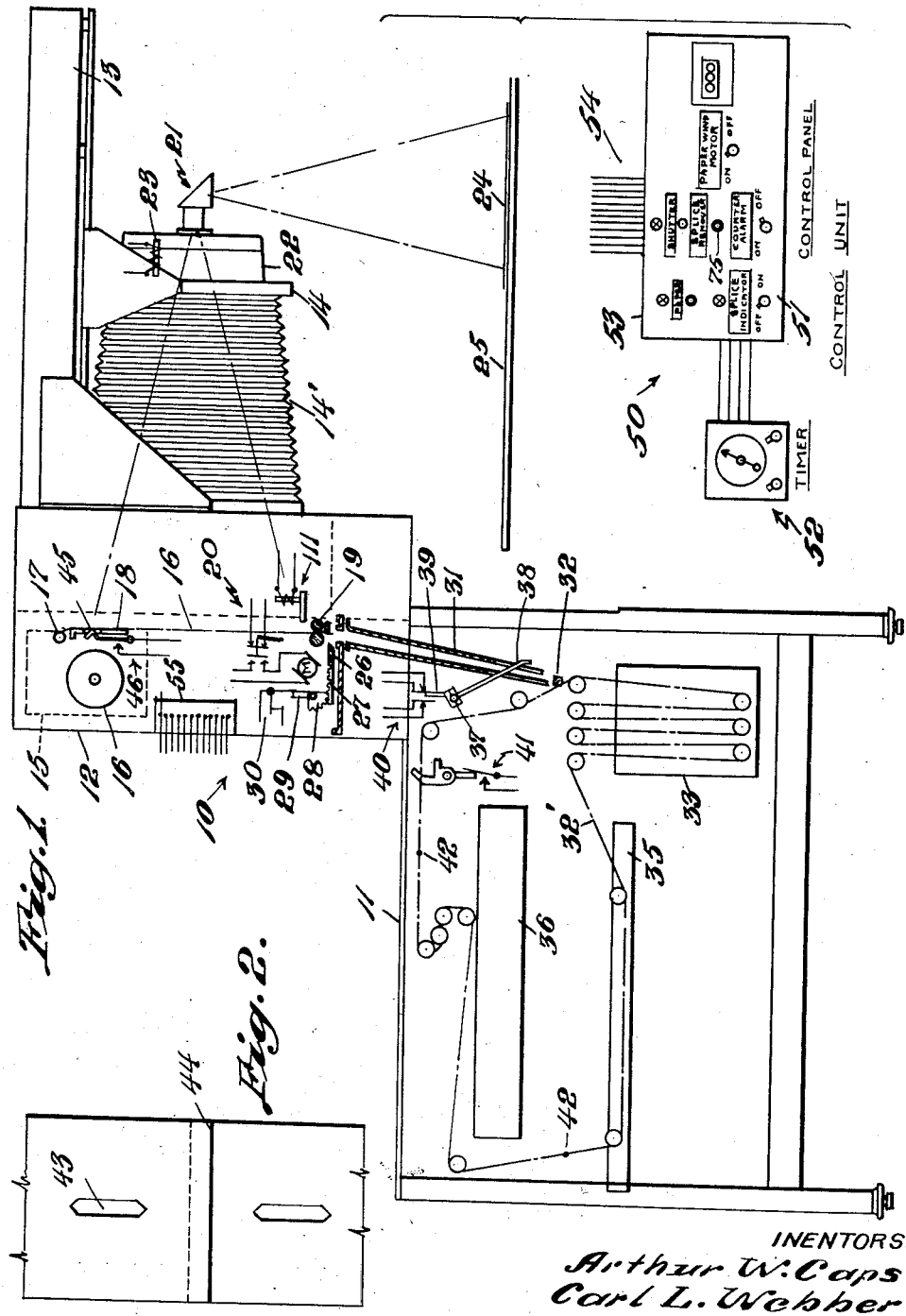
INVENTORS.
Arthur W. Caps
Carl L. Webber
BY Barlow & Barlow
ATTORNEYS.

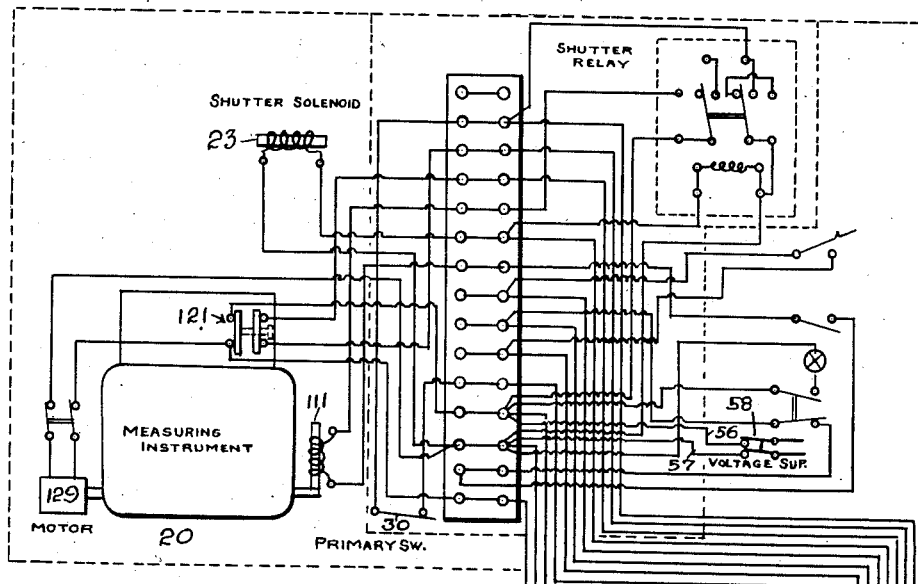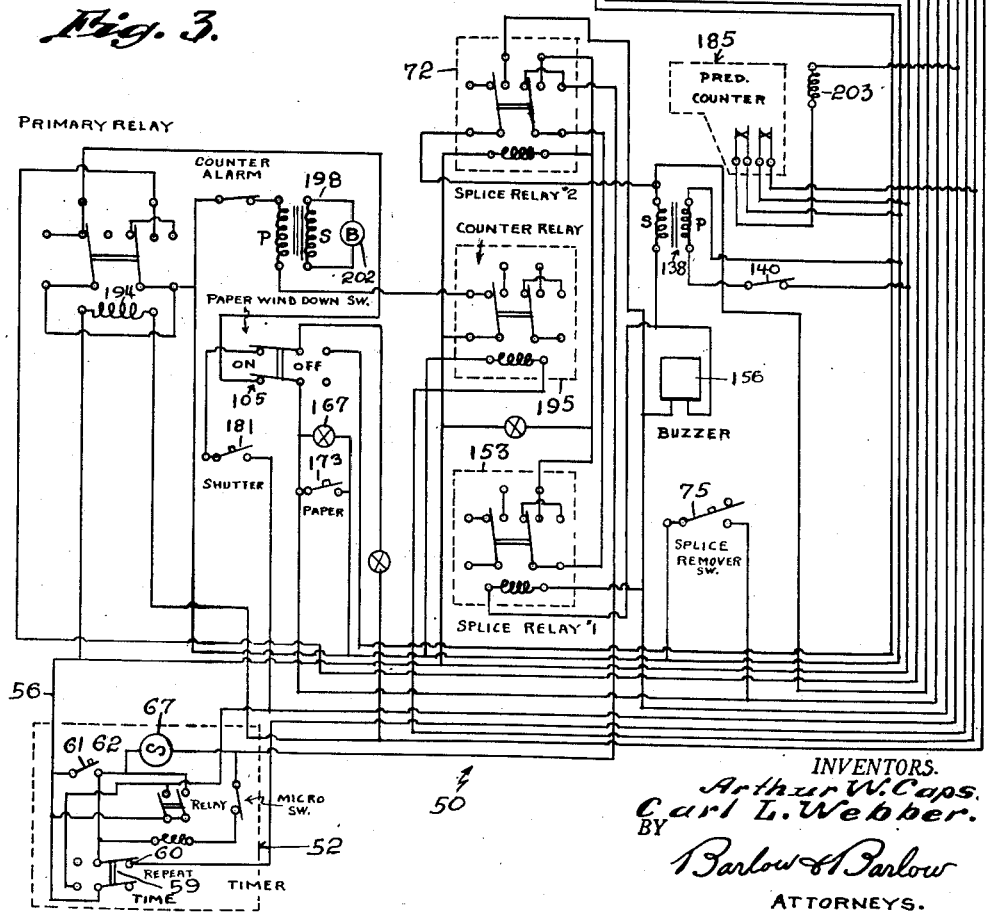
Fig. 3.

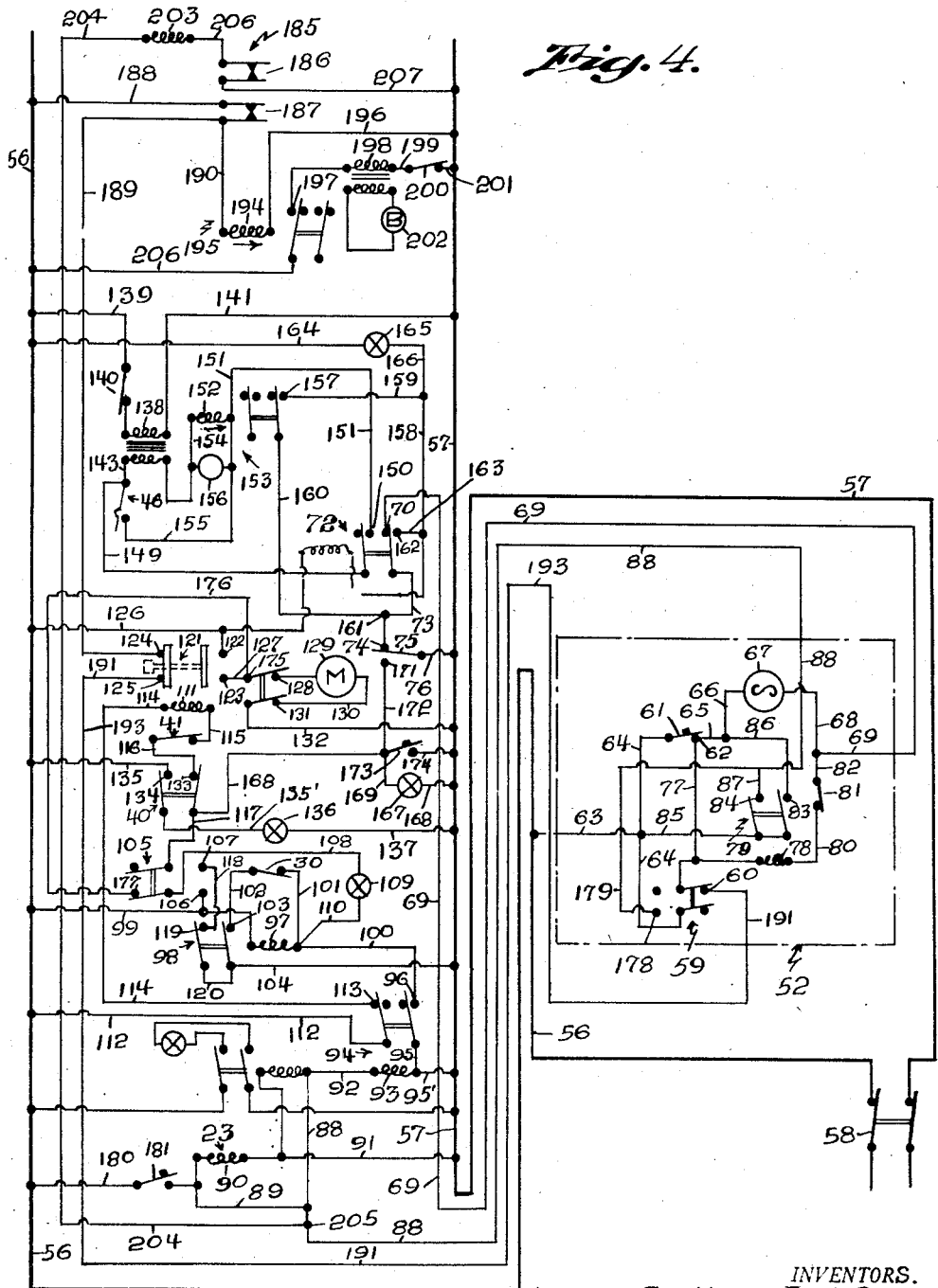

United States Patent Office 2,705,907
Patented Apr. 12, 1955

2,705,907

ELECTRIC CONTROL CIRCUIT FOR A CAMERA

Arthur W. Caps and Carl L. Webber, Rochester, N. Y., assignors to Photostat Corporation, a corporation of Rhode Island Application June 26, 1951, Serial No. 233,666

9 Claims. (Cl. 95—14)

This invention relates to improvements in a photographic copying camera, particularly a camera in which photographic exposures are made upon successive portions of a strip of film which is supplied from a roll and in which each portion after being exposed is fed to a position out of the focal plane of the camera and severed from the remaining unexposed film so that the exposed portion may be conveyed through the various baths to be developed, fixed or otherwise treated.

In making a copy in this type of camera, there is an exposure cycle and a processing cycle. The exposure cycle comprises feeding the unexposed film into proper position in the focal plane of the camera, at which the image or images to be reproduced are formed, opening the shutters of the camera so as to permit the light reflected from the subject to be reproduced to pass through the lens system of the camera to fall upon the said film portion in the said focal plane, severing and withdrawing of the said film portion out of the exposure area to position the now exposed sheet of film at a location to be acted on in the processing cycle of the camera.

The general object of the invention is to provide for the automatic electrical control of the various phases of the exposure cycle and in a manner to coordinate the said exposure cycle with the processing cycle.

Another object of this invention is to provide for the automatic electrical control of the different phases of the exposure cycle so that each operation in the said exposure cycle will follow in a predetermined sequence and which, upon a certain predetermined condition of film, will operate to arrest subsequent operation in the said exposure cycle until such film condition has been corrected.

Another object of this invention is to provide for the automatic electrical control of the different phases of the exposure cycle so that each operation in the said exposure cycle will follow in a predetermined sequence and in which certain of said operations may be manually controlled at the will of the operator.

A further object of this invention is to provide for the automatic electrical repeat of the exposure cycle which may be placed in and out of operation at the will of the operator.

A more specific object of the invention is to provide an electric circuit for controlling in a predetermined sequence the different operations of the exposure cycle and in which electric circuit certain branches thereof may be manually cut in and out of operation.

With these and other objects in view, the invention consists of certain novel features of construction, as will be more fully described and particularly pointed out in the appended claims.

In the accompanying drawings:

Figure 1 is a diagrammatic view of a camera showing the relative positions of various elements of the camera;

Figure 2 is a face view of a fragment of a photographic film illustrating a splice therein;

Figure 3 is a wiring diagram illustrating the electric circuit of the control mechanism; and Figure 4 is a simplified wiring diagram of the electric circuit illustrated in Figure 3.

The present invention may be applied to various different copying cameras or similar machines and is herein shown, by way of example, as applied to a photographic copying camera 10 which is illustrated diagrammatically in Figure 1 and shows generally the relative positions of the various electrically controlled or electrically operated devices which carry out the various steps involved in making a photographic print. The camera includes a frame or support 11, on the upper front portion of which there is mounted a magazine section 12 having an over arm 13 extending forwardly thereof. A front frame 14 is slidably mounted in dependent relation on the over arm 13 and is connected to the magazine section 12 by a bellows 14'. In the magazine section may be placed a support 15 carrying a supply of unexposed sensitized photographic film 16 in the form of a roll, which film may be paper stock coated with a usual photographic emulsion. From the roll 16 the strip of film extends over a guide roller 17 and thence downwardly over the focal plane support 18 of the camera to be engaged by feed rollers 19 forming part of an electrically operated measuring instrument designated generally 20. The measuring instrument may be of any approved manufacture which may be pre-adjusted to withdraw a predetermined length of film 16 over the said focal plane of the camera in position to be subjected to exposure. The film is held flat against the support 18 in position to receive light rays entering the camera through a lens and prism assembly designated generally 21 which is supported on the frame 14 as by means of a lens box 22. Any suitable type of shutter mechanism (not shown) and which may be solenoid operated may be employed. This shutter and its operating solenoid 23 is mounted within the lens box 22 and when in the open position, light rays reflected from a document or other subject 24 placed in position on the work holder 25 pass upwardly to the prism of the lens system 21 and thence rearwardly through the open shutter and bellows 14 to fall against the portion of said film 16 lying in the focal plane at which the image to be reproduced is formed.

In the present disclosure the shutter, which is mounted to be resiliently biased to its closed position, is opened and maintained open by energizing the solenoid 23 and keeping the same energized for a period equal to the required exposure period. Upon the opening of the circuit of the solenoid 23, the shutter will return to its normal closed position. After an exposure has been made, the exposed portion of the film 16 is fed downwardly by rotating the feed rollers 19 through the action of the then energized measuring instrument 20 until the upper edge of the exposed portion of the film is slightly below the feed rollers 19, which feed motion also draws a fresh unexposed portion of film 16 from the supply roll into exposing position in the said focal plane of the camera. The exposed portion of the film is then severed by a knife 26 forming part of the measuring instrument 20 which is actuated by means of a rack 27 to which the knife 26 may be attached and which rack is reciprocated by means of a toothed quadrant 28 engaging the said rack 27 and pivotally mounted intermediate its ends to provide an arm 29 which extends into engagement with a knife switch 30 which is resiliently mounted and is normally held in the closed position by the said arm 29. Upon the knife operating mechanism being set into motion, the quadrant 28 will swing about its pivot to move the knife to sever the said exposed film portion and the arm 29 in a direction to permit the moving of the said switch 30 to the open position.

Upon severing of the exposed portion of the film, the severed portion or print already hanging partially within a paper chute 31 drops to the bottom thereof, its bottom edge resting against a bottom support 32. The lower marginal edge of the print is picked up and drawn out of the chute 31 by suitable means (not shown) carried by an endless conveyor 32' and guided thereby along a predetermined course. As the conveyor is advanced, the print is drawn out of the said chute 31 and downwardly into and through a developing bath contained in a tank 33, thence through a rinsing bath contained in a tank 35, and from there to be deposited into a fixing bath in the tank 36. The paper chute 31 is provided with an indicator which is pivotally mounted as at 37 and provided with an arm 38 which is normally held to extend within the said chute at a position across the path of movement of a dropping print to be engaged thereby to be swung out of the said path. The indicator also has an arm 39 which extends upwardly from the pivot 37 to engage and operate a switch 40 which, when in the closed position, will close a circuit to energize a signal such as a lamp to indicate the presence of a print in the said chute.

In the operation of the camera in making a print, there is an exposure cycle and a processing cycle. In order to coordinate the said exposure cycle with the processing cycle, a switch 41 is positioned in the path of travel of the conveyor which travels at a constant speed and is provided with some element 42 to engage and momentarily open the normally closed switch 41, as will hereinafter appear.

Long rolls of film 16 frequently contain one or more splices. For best results, it is desirable not to make exposures upon the spliced portion of the film. A spliced portion of film is illustrated in Figure 2. Preferably the film is provided with one or more recesses or openings 43 positioned substantially along the center line of the film a slight distance from the splice itself, which is indicated at 44 in the said Figure 2. In the present embodiment of the invention a splice indicator which also indicates the exhaustion of the film, as well as the splice therein, includes a feeler arm 45 which may be resiliently mounted so that its free end tends to pass through the plane of the photographic film at a point near the top of the exposure area and in longitudinal alignment with the center line of the film 16. The unbroken strip of film tends to hold the said feeler arm in a normal inactive position, but when one of said openings 43 is advanced to be opposite the said feeler arm 45, the said free end of the feeler arm passes through such opening. There is associated with this feeler arm a splice indicating switch 46 which is resiliently biased to the open position and engaged to be moved to the closed position by the said feeler arm upon passing through one of said openings 43 or moved through the plane of the film upon the exhaustion of the film. The closing of said switch 46 will energize an electric circuit to set into action a signal to indicate the presence of the splice to the operator.

The above various motions are actuated in coordination with each other by means of an electric circuit which is the subject of the present invention. The electric circuit and mechanism controlled thereby is indicated generally 50 and includes a control unit 51 having a timer mechanism 52 and a control panel 53, on which are mounted various manually operated switches and other electrically operated devices of the said circuit 50. The connecting wires indicated generally 54 of the said switches and various devices mounted thereon extend from the control panel to a contact panel 55 which may be attached to the magazine section of the camera to extend therefrom to the various electric instruments mounted directly on the camera. The control unit 51 may be positioned at a convenient location with regard to the camera to be easily accessible to the operator. The timer mechanism 52 may be of any approved manufacture which operates to provide for a pre-selected exposure period within the range of the timer which in the present instance may be any interval between one and sixty seconds. A timer which has been found satisfactory for this purpose is that known by the name of "Time-O-Lite."

Referring to Figure 4 of the simplified line wiring diagram of the electric circuit, power lines 56 and 57 thereof are connected to a voltage supply (not shown) such as by means of a manually operated main switch 58 which may be positioned at any convenient location on the camera. Assuming the timer mechanism (the detailed structure of which is not shown) has been set by the operator to provide a pre-selected exposure period, the timer switch 59 is positioned to the time position which engages contact 60. The shutter switch 61 of the timer, which may be a button switch spring biased to open position, is pressed to momentarily engage contact 62 which initiates the operations of the various electrically operated and controlled elements of the camera. Upon the closing of the said shutter switch 61, a closed circuit will be established from line 56 through wires 63, 64, now closed switch 61, wires 65, 66 to synchronous motor 67 of the timer, thence by wires 68, 69 to normally closed contacts 70 of splice relay 72, wire 73 to normally closed contacts 74 of splice remover switch 75 and wire 76 to line 57.

A closed circuit is also established from line 56 through wires 63, 64, switch 61, contact 62 and wire 77 to one side of armature 78 of relay 79 of the timer, and thence from the other side of the armature 78 through wire 80, normally closed micro switch 81 and wire 82 to wire 69 and thence as above described to line 57.

Upon energizing of armature 78, the set of contacts 83, 84 of relay 79 will be moved to the closed position; the shutter switch 61 will be opened; and the motor circuit will be from line 56, wires 63 and 85, contact 83 of relay 79, wire 86 to wire 66 to motor 67 and thence through wires 68, 69 and as previously described to line 57. The closing of contacts 83, 84 also establishes a closed circuit which branches in two directions. One of said branches is closed from line 56, wires 63, 85, contact 84, wires 87, 88 and 89 to one side of the coil 90 of shutter solenoid 23 and from the other side of coil 90 through wire 91 to line 57, which will energize the solenoid 23 to open the shutter of the camera to which it is mechanically connected, as previously described. The other of said branches is closed from line 56 through wires 63, 85, contact 84, wires 87, 88, wire 92 to one side of armature 93 of shutter relay 94 and from the other side of armature 93 by wire 95' to line 57. Energizing of armature 93 will close the set of contacts 96 of relay 94 to energize the armature 97 of a primary relay 98 through a circuit from line 56 through wire 99, to armature 97, and wire 100, contacts 96 and wires 95, 95' to line 57.

Upon the synchronous motor 67 having been in operation for the selected period, the same through a gear and cam mechanism (not shown) will open the micro switch 81 to open the relay circuit of the timer 52 to de-energize the armature 78 thereof allowing the contacts 83, 84 to move to open position, thus breaking the circuit to the shutter solenoid 23 to permit the shutter to be moved to the closed position and to also de-energize the shutter relay armature 93 allowing its contact 96 to be opened. However, the armature 97 of the primary relay is maintained energized through a closed circuit from line 56, wire 99 to armature 97, and wire 101 through normally closed knife switch 30, wire 102 to now closed contact 103 of primary relay and thence through wire 104 to line 57.

There is provided a switch 105, herein designated a paper wind down switch, which at the start of operation is manually moved to the "on" position to close its contacts 106 and 107 which establishes a shutter pilot light circuit from line 56, wire 99, contact 106, switch 105, wire 108, lamp 109, thence through wires 110 to wire 101, closed switch 30, wire 102 to closed contact 103 of primary relay and wire 104 to line 57. This lamp 109 is illuminated the instant that the primary relay is energized and remains illuminated until such time as the said primary relay is de-energized so as to indicate that the camera shutter has been opened and the exposure made on the film which completes the exposure cycle operation of the camera.

The processing cycle as previously indicated is coordinated with the exposure cycle by means of the tank timer switch 41 which may be resiliently mounted to be biased to open position and momentarily closed at certain intervals by the engagement thereof with the elements 42 carried by the conveyor. The momentary closing of the said tank switch 41 completes the circuit of the solenoid coil 111 from line 56, connecting wires 112, closed contact 113 of the now de-energized shutter relay 94, thence through wire 114 to one end of solenoid coil 111, through coil 111, wire 115 to tank switch 41, through tank switch and wire 116 to closed paper chute switch 40, wire 117 to paper wind down switch 105, closed contact 107, wire 118 to close contact 119 of primary relay and thence through wires 120, 104 to line 57. This circuit energizes the said solenoid 111 of the measuring instrument. The solenoid 111 operates a lever (not shown) which is mechanically connected to the measuring instrument switch 121 to close its contacts 122, 123 and open the normally closed contacts 124, 125 of the said switch 121. Current will now flow from line 56, through wire 126, closed contacts 122, 123, wire 127 to one set of normally closed contacts 128 of an overload switch, thence through motor 129 of the measuring instrument 20, from the motor 129 through wire 130 to the other set 131 of the overload switch and through wire 132 to line 57. The energized motor 129 will now operate the measuring instrument mechanism to rotate the feed rollers 19 to feed downwardly the exposed portion of the film 16 and to draw a fresh unexposed portion of film from the supply roll into the said focal plane of the camera. The tank switch 41 is tripped to momentarily energize the measuring switch solenoid 111 and then moves back to normal opened position which de-energizes the said solenoid 111. However, the contacts 122, 123 are held in the said closed position by means of the said lever (not shown) which is in turn held by the measuring instrument which upon completing its feeding cycle, releases the said lever to return the switch 121 to normal position. The measuring instrument, as previously described, also operates the severing knife 26 to cut off the exposed portion of film 16 from the unexposed supply, which movement of the knife momentarily opens the switch 30 to de-energize the primary relay holding coil and re-set the circuit so far described to initial condition and completing one cycle operation thereof, the above motions being repeatable at will of the operator by pressing the shutter switch 61, as previously described.

The exposed sheet of film 16 upon being severed will, as heretofore described, drop into the chute 31 where it will remain until picked up by the conveyor 32 to be carried to the various processing baths. The dropping of said sheet into the chute 31 will engage and swing the arm 38 about the pivot 37 to move the arm 39 from the position shown in Figure 1 to permit opening of contact 133 and closing of contact 134 of the paper chute switch 40. The opening of the contact 133 opens the circuit of the coil 111 of the measuring instrument switch through the paper chute switch 40, thus preventing energizing of the measuring instrument motor 129 while a sheet of film is contained in the paper chute. The closing of the contact 134 of the paper chute switch 40 establishes a circuit from line 56 through wire 135 to switch 40, through closed contacts 134' wire 135' to paper chute pilot lamp 136 and wire 137 to line 57, thus illuminating lamp 136 to indicate the presence of a sheet of film in the paper chute 31. Upon the removal of said sheet from the chute 31, the arm 38 will be moved to initial position and the switch 40 will be opened at contact 134 and closed at contact 133.

The branch circuit of the splice control has a transformer 138, one side of the primary coil of which is connected to the line 56 by a wire 139 to a manually operable, splice indicating switch 140. The other side of the primary coil is connected by a wire 141 to the line 57. The switch 140 is provided for cutting the transformer in and out of the circuit should it be desired and is moved to the closed position at the start of operation. The secondary coil of the transformer 138 is provided with a first circuit through wire 143 to one side of switch 46, thence through wire 149 to contact 150 of relay 72, from contact 150 through wire 151 to armature 152 of splice relay 153, through said armature and wire 154 to the other side of the said secondary coil. A second circuit is made through wire 143, switch 46, and wire 155 to coil 152. A buzzer or other similar electrically operated audible signaling device 156 is shunted across wires 154 and 155.

When a spliced section of film 16 is moved past the feeler arm 45 so as to position one of the said openings 43 opposite to said feeler arm, the arm will pass through the opening, as previously described, to close the normally opened switch 46 energizing the armature 152 of the relay 153 and actuating the buzzer 156 to indicate a spliced section of film 16 has been advanced into the focal plane of the camera. The energizing of the armature 152 will move the normally opened contact 157 to the closed position to energize the first circuit, above described, of the secondary armature of the transformer 138 from line 56, wire 126 to the armature of relay 72, through the said armature, wires 158 and 159 to now closed contacts 157, wire 160 to junction 161, and from there through contact 74 of splice remover switch 75, thence wire 76 to line 57. The relay 72 will have closed its normally opened contacts 150, 162 and opened contacts 70. Thus, the timer mechanism and shutter circuits will be opened at the contact 70 so as to prevent opening of the shutter of the camera to make an exposure while said spliced section is in the focal plane of the camera. The first circuit of the secondary coil of relay 138 will maintain the relay 153 energized upon opening of switch 46 upon further movement of the spliced section past the arms 45.

A second circuit through the armature of relay 72 will also be established from line 56, wire 126 to and through said armature, thence through wires 158 and 163 to close contacts 162, thence through wire 73 to contacts 74 of splice remover switch 75, and wire 76 to line 57. This circuit maintains the relay 72 energized upon the opening of the said primary circuit of transformer 138. A further circuit is provided from line 56 through wire 164 to pilot lamp 165, wires 166, 159 to closed contact 157 and wires 160 to junction point 161, thence to contacts 74 of splice remover switch 75, thence through wire 76 to line 57. This will energize the lamp 165 to indicate visually that a spliced section of film 16 has been moved into the said focal plane of the camera.

The opening of the timer circuit at the contact 70 in the splice relay 72, as above mentioned, prevents the operator from making an exposure on a spliced section of film until the operator performs certain functions to remove the said sections of film from the focal plane of the camera. Once the splice relay 72 has been energized, the circuits it controls will remain closed until the circuit is broken at the splice remover switch 75. In order to indicate the proper time to operate the splice remover switch 75, a pilot lamp 167 is positioned to be energized upon closing of the tank timer switch 41. The lamp circuit is from line 56, wire 112 to closed contacts 113 of shutter relay 94, wire 114 to and through coil 111, thence through wire 115, tank switch 41, wire 116 to closed contact 133 of paper chute switch 40 and wires 168, 169 to lamp 167 and thence through wire 168 to line 57.

Upon closing of tank switch 41 the lamp 167 will be illuminated and the splice remover switch 75 may now be moved to open its contacts 74 and close its normally open contact 171. Closing of contact 171 closes a circuit from line 56, wire 112, closed contact 113 of shutter relay 94, wire 114 to and through coil 111 of measuring instrument switch 121, thence through wire 115 through tank switch 41, contact 133 of paper chute switch, thence wires 168, 172 to closed contacts 171 of switch 75 and from said switch through wire 76 to line 57. The solenoid 111 being energized will move switch 121 as previously described to close the circuit of the motor 129 of the measuring instrument 20 through contacts 122 and 123. The feed rollers 19 will now be turned to remove the said spliced section of film 16 from the focal plane of the camera and in the severing of said section of spliced film, the knife switch 30 will be opened to return the complete electric circuit to initial normal operating position whereby subsequent exposures may be made.

It is desirable to provide for making more than one exposure on a single sheet of film and to this end, a branch circuit is established which is controlled by a manually operated paper switch 173. When more than one exposure is to be made on a single sheet, the paper wind down switch 105 is moved to the off position which cuts off the primary relay coil 97 from the balance of the circuit through opening of contacts 106 and 107 of the switch 105. The timer mechanism may now be set to provide for the selected period of exposure and the timer switch positioned to close its contacts 60. The shutter switch 61 may now be closed to initiate the timer mechanism which will operate as above described to cause the shutter to open the selected period of timer and then to open micro switch 81. The shutter switch may again be closed for another exposure, this being repeated for the number of desired exposures to be made on a single sheet. When the tank pilot lamp 167 is illuminated, the said paper switch 173 may be moved to the closed position which establishes a closed circuit between lines 56, 57 through wire 174 from line 57 to closed switch 173, line 168 to closed contact 133 of paper chute switch 40, thence through wire 116 to closed tank switch 41 and wire 115 to solenoid coil 111, wire 114 from solenoid to contact 113 of shutter relay 94 and thence through wire 112 to line 56, which closed circuit energizes the measuring instrument 20 to wind down the section of film exposed from the focal plane.

The portion of the electric circuit so far described may be referred to as the cycle control operation of the camera which operates to provide a predetermined sequence of operation for each exposure made and is manually controlled from the shutter switch 61, it being necessary to close the contact 62 for each exposure made. In order to indicate that the measuring instrument is in motion and to warn the operator from making another exposure when the film is being advanced, the pilot lamp 109 is illuminated during the operation of the measuring instrument by a circuit which is established from line 56 through wire 126 to closed contacts 122, 123 of measuring instrument switch 121, thence through wire 127 to junction 175, wire 176 to closed contact 177 of paper wind down switch 105, through said switch and line 108 to pilot lamp 109, wires 110, 101 to switch 30 and through wire 102 to closed contacts 103 of primary relay, and thence through wire 104 to line 57.

The circuit thus far described also provides for making exposures of longer periods than provided by the timer mechanism. This is accomplished by providing a branch circuit from the contact 178 of timer switch 59 by wires 179, 88, 89 to coil 90 of shutter solenoid 23, thence through wire 91 to line 57, this branch being closed upon moving the timer switch to close contact 178, through wires 64, 63 to line 56. The solenoid 23 will remain energized while the contact 178 is maintained closed. It may also be desirable at times in the operation of the camera to by-pass the timer mechanism and manually control the opening and closing of the camera shutter. To this end, line 56 is connected directly through a wire 180 and manual switch 181 to shutter solenoid 23 and from said solenoid by wire 91 to line 57. This switch is normally held in the opened position.

The circuit also provides for an automatic repeat predetermined cycle control by means of which any number of copies may be made automatically and then the camera mechanism will come to rest. To this end, an electrically operated, predetermining counter mechanism 185 is provided. The structure of this counter is not shown and may be of any approved manufacture. That being known as a "Veeder Root" counter and manufactured under one or more of the following patents, 2,040,025, 2,040,026, 2,040,027 and 2,159,314, has been found satisfactory in practical use. This counter is of the rotating disc type in which the counter wheels thereof may be pre-set to a predetermined number of counts. When the counter has been operated to equal the said pre-set number, its mechanism will operate to open its electrical contacts 186, 187. These contacts are moved to be closed when pre-setting the counter. The said counter 185 is electrically connected in the electric circuit thus far described by means of a wire 188 extending from line 56 to closed contacts 187 thence through wire 189 to normally closed contacts 124, 125 of measuring instrument switch 121, from said contacts by wire 191 to contacts 60 of timer switch 59, thence through relay armature 78, wire 80, micro switch 81, wires 82, 69 to contact 70 of splice relay 72 and through wire 73 to contact 74 of splice remover switch 75 and wire 76 to line 57. The motor 67 now being energized from line 56, through wires 63, 85, closed contact 83 of relay 79, thence through wires 86, 66 to motor 67 and from motor through wires 68 to wire 69 and to line 57 as above described. The armature 194 of the counter relay 195 will be energizing directly from line 56, wire 188 to closed contacts 187, wire 190 to armature 194 and from there through wire 196 to line 57. This will energize armature 194 to move counter relay 195 to open its contacts 197 to primary of alarm transformer 198 connected at its other side through wire 199 to counter alarm switch 200 in turn connected through wire 201 to line 57. A bell or other suitable signal 202 is shunted across the secondary of the transformer 198.

Assuming a predetermined number of copies of a single subject to be made, the predetermined counter 185 is adjusted or pre-set for said predetermined number of copies. The alarm switch 200 and the splice indicator switch 140 are moved to to the closed position. The timer switch 59 is moved to close contact 60 thereof which initiates the operation of the timer mechanism 20 through the connections above described to the counter 185. The operation of timer, subsequent relays, solenoids, and so forth, will proceed in the predetermined sequence as previously described. The energizing of coil 111 will open the contacts 124, 125 of the measuring switch 121 to open the circuit from the counter 185. Upon severing of the exposed portion of the film 16, the knife switch 30 will open to again re-set the circuit which upon the return of contacts 124, 125 to closed position will again start the timer 59 in action to repeat the cycle of the exposing of the film. This will continue until the predetermined number of copies has been made whereby the counter 185 has operated to open the contact 187. Upon the opening of contacts 187, the armature 194 of relay 195 will be de-energized to close contact 197 to energize the primary of transformer 198 through wire 206 from line 52 and through closed switch 200 to line 57. This will energize the secondary of the transformer to operate the signaling device 202 to indicate the finish of the predetermined number of copies made. The alarm switch 200 may now be opened to open the entire circuit.

The recording wheels of the counter 185 are turned one digit for every exposure made. This is accomplished by a counter solenoid 203 which is mechanically connected to the counter mechanism (not shown). The solenoid 203 has one side thereof connected through wire 204 to junction point 205 in wire 88, thence through wires 88, 87, closed contact 84, wires 85 and 63 to line 56. The other side of said coil 203 is connected through wire 207 to contacts 186 and thence through wire 207 to line 57. The contacts 186 will also be moved to the open position simultaneously with the opening of contacts 186, thus de-energizing the solenoid when not in operation.

We claim:
1. In an electric circuit for automatically controlling the exposure cycle of operation of a camera for making photographic copies, a source of electric energy, a solenoid operable for moving the shutter mechanism of the camera to open position, a timer operable for controlling the open period of said shutter and connected in series with said solenoid and said source of electric energy, a primary relay having a pair of normally open contacts, a second relay having a normally closed contact and a normally open contact connected in series with the armature of the primary relay across said source, a third relay having a pair of normally open contacts and a pair of normally closed contacts connected in series with said timer across said source, said timer having a normally open contact connected in series with the armature of the said second relay across said source to energize the same and move its contact to the closed position to energize the armature of the primary relay and move the said contacts thereof to the closed position, a holding circuit for the said primary relay coil including one of the said normally open contacts of said primary relay in parallel with one of the said normally open contacts of the second relay, a manually operable switch normally closed and connected in series with the said pair of normally closed contacts of the said third relay and with said timer, across said source, a film feeding, electrically operated instrument and a solenoid operated control switch therefor, a solenoid for operating said control switch connected across said source in series with one of the said normally closed pair of contacts of the second relay and in series with the other of the contacts of the primary relay and through which said solenoid is energized upon the de-energizing of said second relay to initially move said control switch to closed position, means in said film feeding instrument operable while in operation for holding said control switch in the closed position, a fourth relay having an armature coupled across said source and a normally open contact connected in series with the armature of the third relay and through which said third relay is energized upon the closing of the said open contact of the fourth relay, a switch connected in series with the armature of the fourth relay and held normally open by engagement thereof with the film as fed through the camera but moved to closed position upon engagement thereby by a predetermined film condition to energize said fourth relay to close the said open contact thereof to energize the third relay to move its normally closed contacts to open position to open the circuit of the said timer at the said third relay.

2. In an electric circuit for automatically controlling the exposure cycle of operation of a camera for making photographic copies and having a solenoid operated shutter mechanism, a solenoid connected to said shutter mechanism and operable for moving the shutter of the camera to open position, a source of electric current, a timer mechanism connected in series with said solenoid across said source for controlling the energizing thereof, a plurality of electro-magnetic units connected in circuit with each other and with said timer for controlling the supply of current to said timer and solenoid, one of said electro-magnetic units being connected in series with said timer and initially energized from said source upon the energizing of said solenoid, a holding circuit for said one of said units for supplying current from said source independent of the circuit initially supplying current to the said one of the said units, a film feeding mechanism positioned to engage and feed the film through the camera and having a solenoid-operated switch therein held normally open but moved to closed position to supply current to said film feeding mechanism from said source, the solenoid of said switch being connected in circuit with the said one of said units and another of said units, and a switch at a position to be engaged by the film fed through the camera and held normally opened by said film and biased to move to closed position upon a predetermined film condition, said switch being connected in circuit with said units and operable to open the circuit of the timer mechanism upon said predetermined film condition.

3. An electric circuit for automatically controlling and coordinating the exposure and processing cycle of operations of a camera for making photographic copies comprising a source of electrical current, a solenoid operable for moving the shutter mechanism of the camera to open position for making an exposure, a timer mechanism operable for controlling the open period of said shutter and in circuit with said current source including a motor, a relay whose contacts are in circuit with and through which the coil of said solenoid is energized from said source, a switch in series with said motor and said relay across said source and normally closed and moved to open position by the operation of said motor upon a predetermined selected time period of operation thereof to open the motor and relay circuit and de-energize the said shutter solenoid, a primary relay, a second relay whose contacts are in circuit with the armature of said primary relay across said source and through which said primary relay is initially energized, a pair of normally open contacts on said primary relay in parallel with said contacts of the second relay through which said primary relay is held energized, a manually operable switch, a third relay whose normally closed contacts are in series with said manually operable switch and through which the motor and relay of the timer mechanism circuit is completed across said source, a film feeding mechanism having a second motor therein connected on one side thereof to said current source, a solenoid-operated switch having a pair of normally open contacts through which the other side of motor of the said feeding mechanism is connected to said current source to complete the circuit of said last-mentioned motor, a second solenoid for operating said solenoid-operated switch, one side of whose coil is in circuit with said current source through the normally closed contacts of the second relay and the other side thereof in circuit with the contacts of the primary relay, a cycle coordinating switch in series with said second solenoid and the contacts of said primary relay and normally open, means in the mechanism of the said processing cycle operation for closing said coordinating switch to energize said second solenoid to actuate the motor of the film feeding mechanism, means to hold said coordinating switch in the closed position while said second motor is in operation, means operable to move the primary switch to open position upon a predetermined period of operation of said second motor to place the circuits in initial condition, a fourth relay, a film condition operated switch in series with the armature of said fourth relay across said source and normally open but closed upon a predetermined film condition to initially energize said fourth relay, a holding circuit including the normally open contacts of the third relay in parallel with said film condition switch, said third relay being in series with the contacts of said fourth relay through which said third relay is energized to move its normally closed contacts to open position to open the circuit of the timer mechanism and close the holding circuit of the fourth relay.

4. In an electric circuit for automatically controlling the exposure cycle of operation of a camera for making successively a predetermined number of prints, a source of electric energy, a solenoid operable for moving the shutter mechanism of the camera to open position, a timer operable for controlling the open period of said shutter mechanism and connected in series with said solenoid across said source and through which said solenoid is energized, a film feeding mechanism having a control switch provided with a pair of normally open contacts through which current is supplied to said feeding mechanism from said source and a pair of normally closed contacts, a predetermined counter device adjustable to be pre-set for a selected number of prints to be made and having a switch therein moved to the closed position upon the pre-setting of said counter and thereafter moved to open position and through which current is initially supplied to said timer from said source, said switch being connected in series to the said normally closed contact of said control switch and in circuit with said timer, and a switch positioned to be engaged by the film as fed through the camera to be held normally opened by contact with the film and biased to be moved to closed position upon a predetermined film condition to open the timer circuit upon said predetermined film condition.

5. An electric circuit for automatically controlling and coordinating the exposure and processing cycle of operations of a camera for making successively a predetermined number of photographic copies comprising a source of electric current, a solenoid operable for moving the shutter of the camera to open position for making an exposure, a timer mechanism operable for controlling the open period of said shutter and connected in series with said solenoid across said source, a switch in the timer mechanism held in normal closed position and moved to open position at the end of a predetermined period of operation of said timer to open the timer circuit and thereafter moved to the said closed position to pre-set said timer circuit for a subsequent operation thereof, a film feeding mechanism connected in circuit to one side of said current source and having a control switch provided with a pair of normally closed contacts and a pair of normally open contacts connected in series with said mechanism to the other side of said current source, a primary relay, a second relay having an armature in series with said timer across said source, said second relay having a pair of normally closed contacts and a pair of normally open contacts, said primary relay having an armature connected in series with said normally open contacts of said second relay across said source, said primary relay having a pair of normally open contacts, a holding circuit for said primary relay including one of said normally open contacts of said primary relay in parallel with the normally open contacts of the second relay, a third relay having a pair of normally open contacts and a pair of normally closed contacts connected in series with said timer and through which the timer circuit is completed, a solenoid for operating said control switch connected across said source and in series with the said normally closed contacts of the second relay and to the other of the said open contacts of the primary relay, a switch connected in series with said solenoid and the said other open contact of the primary relay held normally open but temporarily moved to closed position at intervals by the mechanism of the processing operation of the camera to energize said solenoid to move said switch to close the said normally open contacts thereof and open the said normally closed contacts thereof to supply current to said film feeding mechanism, means operated by said film feeding mechanism to hold said control switch in open position when in film feeding operation and to move said primary switch to open position at the end of the feeding operation thereof to open the holding circuit of the primary relay, a counter device adjustable to be pre-set for a pre-selected number of counts, a switch in said counter moved to closed position upon the pre-setting of said counter and moved to open position at the end of said pre-selected number of counts, said switch being connected on one side thereof to one side of the source of current and on the other to one of the contacts of said normally closed contacts of the control switch, the other normally closed contact being connected in circuit with said timer and through which said timer is initially energized, and a switch in said system held normally open by engagement thereof with the film as fed through the camera but moved to the closed position to open the circuit of said system.

6. In an electric circuit for automatically controlling the exposure cycle of a camera having a solenoid operated shutter mechanism, a source of electric current for said circuit, a solenoid connected to said shutter mechanism and operable for moving the shutter mechanism to open position for making an exposure, a first relay having a pair of normally open contacts and a pair of normally closed contacts, a timer circuit connected in series with the coil of said solenoid and said source of current, said timer circuit being additionally connected in series with the said pair of normally closed contacts of the first said relay across said source, a switch in the said timer circuit normally closed and moved to open position upon a predetermined selected time period of operation of said timer circuit to open the timer circuit, a second relay having an armature coupled across said source of current and having a normally open contact connected in series with the armature of the first said relay, a second switch connected in series with the armature of the second relay and through which switch the armature of the second relay is energized, said second switch being positioned to be engaged and held open by the film fed through the camera and biased to move to closed position upon engagement thereof by a predetermined film condition to close the circuit to the armature of the second relay to close the said open contact thereof thereby closing the circuit of the armature of the first said relay to move its normally closed contacts to open position and open the timer circuit.

7. In an electric circuit for automatically controlling the exposure cycle of a camera having a solenoid operated shutter mechanism, a source of electric current for said circuit, a solenoid connected to said shutter mechanism and operable for moving the shutter mechanism to open position for making an exposure, a first relay having a pair of normally open contacts and a pair of normally closed contacts, a timer circuit connected in series with the coil of said solenoid and said source of current, said timer circuit being additionally connected in series with the said pair of normally closed contacts of the first said relay across said source, a switch in the said timer circuit normally closed and moved to open position upon a predetermined selected time period of operation of said timer circuit to open the timer circuit, a second relay having an armature coupled across said source of current and having a normally open contact connected in series with the armature of the first said relay, a second switch connected in series with the armature of the second relay and through which switch the armature of the second relay is energized, said second switch being positioned to be engaged and held open by the film fed through the camera and biased to move to closed position upon engagement thereof by a predetermined film condition to close the circuit to the armature of the second relay to close the said open contact thereof thereby closing the circuit of the armature of the first said relay to move its normally closed contacts to open position and open the timer circuit at said first relay, and a holding circuit for said second relay including said normally open contacts of the first said relay connected in series with said source of current and the armature of the said second relay.

8. In an electric circuit as set forth in claim 7, an electrically operated, audible signalling device connected across the armature of the said second relay.

9. In an electric circuit as set forth in claim 7, a lamp connected in series with the armature of the said first relay.

References Cited in the file of this patent

UNITED STATES PATENTS

| | | |
|---|---|---|
| 1,671,588 | Josepho | May 29, 1928 |
| 1,671,644 | Josepho | May 29, 1928 |
| 1,816,290 | Klimis | July 28, 1931 |
| 1,915,791 | Klimis | June 27, 1933 |
| 2,351,399 | Caracciolo | June 13, 1944 |
| 2,552,250 | Bornemann | May 8, 1951 |
| 2,552,251 | Bornemann | May 8, 1951 |
| 2,616,331 | Pavelle | Nov. 4, 1952 |